United States Patent

Hums

[11] Patent Number: 5,283,052
[45] Date of Patent: Feb. 1, 1994

[54] APPARATUS FOR REGENERATING DEPLETED DENO$_x$ CATALYSTS

[75] Inventor: Erich Hums, Bamberg, Fed. Rep. of Germany

[73] Assignee: Siemens Aktiengesellschaft, Munich, Fed. Rep. of Germany

[21] Appl. No.: 860,057

[22] Filed: Mar. 27, 1992

[30] Foreign Application Priority Data

Mar. 28, 1991 [DE] Fed. Rep. of Germany ....... 4110337

[51] Int. Cl.$^5$ .............................................. B01J 23/90
[52] U.S. Cl. ................................... 422/223; 422/177; 422/178; 502/34
[58] Field of Search ............... 422/171, 172, 177, 223, 422/178, 194, 234; 502/34, 20; 423/239

[56] References Cited

U.S. PATENT DOCUMENTS

| | | | |
|---|---|---|---|
| 4,029,636 | 6/1977 | Lowry et al. | 502/20 |
| 4,061,596 | 12/1977 | Matsushita et al. | 502/439 |
| 4,078,898 | 3/1978 | Fedor et al. | 422/177 |
| 4,142,989 | 3/1979 | Kohama et al. | 502/34 |
| 4,393,031 | 7/1983 | Henke | 422/172 |
| 4,618,593 | 10/1986 | Sasaki et al. | 502/34 |
| 4,757,038 | 7/1988 | Sasaki et al. | 502/34 |
| 4,871,522 | 10/1989 | Doyle | 423/239 |
| 4,975,256 | 12/1990 | Hegedus et al. | 423/239 |

FOREIGN PATENT DOCUMENTS 0353467 2/1990 European Pat. Off. .
3311521 1/1984 Fed. Rep. of Germany .
7426576 3/1975 France .

*Primary Examiner*—Robert J. Warden
*Assistant Examiner*—Hien Tran

[57] ABSTRACT

An apparatus for regenerating depleted deNO$^d$ catalysts includes a combustion chamber having a combustion zone, a flue gas conduit communicating with the combustion zone and a deNO$_x$ catalyst having surfaces in the flue gas conduit. An injection device may be disposed between the combustion zone and the surfaces for injecting molybdenum-oxide-containing dust when the deNO$_x$ catalyst is depleted, or a molybdenum-oxide-containing surface may be disposed in the flue gas conduit between the combustion zone and the surfaces for regeneration when the deNO$_x$ catalyst is depleted.

11 Claims, 1 Drawing Sheet

APPARATUS FOR REGENERATING DEPLETED DENO$_x$ CATALYSTS

The invention relates to a method and an apparatus for regenerating depleted deNO$_x$ catalysts.

Each time combustion takes place with oxygen from the air, variable quantities of nitrogen oxides are produced as a function of temperature. In order to reduce the nitrogen oxides in the flue gases of combustion systems, it is known to reduce the nitrogen oxides into nitrogen and water vapor on catalytically active surfaces in the presence of a reducing agent, such as ammonia or urea. To this end, oxides of one or more of the metals titanium, vanadium, molybdenum and tungsten are used. The catalysts are used in the form of honeycomb bodies or plates or braided structures coated with a catalytically active composition.

It has been demonstrated that the catalytic activity of such catalysts fades more or less markedly over time. Such fading in catalytic activity, which is substantially dictated by many kinds of catalyst poisons and contaminants entrained in the flue gas, finally makes the replacement of the catalysts unavoidable. However, replacing the catalysts entails considerable expense and produces pollutants that must be disposed of. It also requires that the power plant be shut down for a relatively long time, which entails additional expenses.

It is accordingly an object of the invention to provide a method and an apparatus for regenerating depleted deNO$_x$ catalysts, which overcome the hereinafore-mentioned disadvantages of the heretofore-known methods and devices of this general type and which provide a way of regenerating more or less greatly depleted deNO$_x$ catalysts.

With the foregoing and other objects in view there is provided, in accordance with the invention, a method for regenerating depleted deNO$_x$ catalysts, which comprises depositing a molybdenum-oxygen compound or its precursor onto a depleted deNO$_x$ catalyst. This method makes it possible to markedly increase the activity of already largely depleted deNO$_x$ catalysts again.

In accordance with another mode of the invention, there is provided a method which comprises depositing MoO$_3$ on surfaces of the depleted deNO$_x$ catalyst.

In accordance with a further mode of the invention, there is provided a method which comprises depositing molybdenum-oxide-containing dust onto surfaces of the depleted deNO$_x$ catalyst.

In accordance with an added mode of the invention, there is provided a method which comprises injecting molybdenum-oxide-containing dust into a flue gas conduit upstream of surfaces of the depleted deNO$_x$ catalyst.

In accordance with an additional mode of the invention, there is provided a method which comprises applying molybdenum oxide in a vapor phase onto surfaces of the depleted deNO$_x$ catalyst.

In accordance with yet another mode of the invention, there is provided a method which comprises dumping molybdenum oxide in a flue gas conduit upstream of catalytically active surfaces, entraining and desorbing the molybdenum oxide with flue gas moisture at a temperature of substantially from 100 to 500° C., and preferably substantially 350° C. or 420° C., and depositing the molybdenum oxide onto surfaces of the depleted deNO$_x$ catalyst. This provision leads to a continuous transfer of molybdenum-oxygen compounds onto the downstream catalytic surfaces and leads to a continuous stabilization of the catalytic activity of these catalysts.

In accordance with yet a further mode of the invention, there is provided a method which comprises dumping molybdenum oxide in a flue gas conduit, and injecting water vapor into flue gas in the flue gas conduit upstream of surfaces of the depleted deNO$_x$ catalyst and upstream of the dumped molybdenum oxide as needed.

In this way, the transfer of the molybdenum oxide, dumped in the flue gas conduit, onto the surfaces of the deNO$_x$ catalysts can be controlled, as needed. This method becomes possible because it has been demonstrated that the molybdenum oxide is transported to an increased extent in the presence of water vapor.

With the objects of the invention in view, there is also provided an apparatus for regenerating depleted deNO$_x$ catalysts, comprising a combustion chamber having a combustion zone, a flue gas conduit communicating with the combustion zone, a deNO$_x$ catalyst having surfaces in the flue gas conduit, and an injection or nozzle feeder device disposed between the combustion zone and the surfaces for injecting molybdenum-oxide-containing dust when the deNO$_x$ catalyst is depleted.

In this way, the method of the invention can be carried out right in the combustion system or in the power plant. With this kind of apparatus, the catalytic activity of the downstream deNO$_x$ catalysts can be replenished again and again, without having to remove the deNO$_x$ catalysts or to shut down the combustion system or power plant for that purpose.

With the objects of the invention in view, there is alternatively provided an apparatus for regenerating depleted deNO$_x$ catalysts, comprising a combustion chamber having a combustion zone, a flue gas conduit communicating with the combustion zone, a deNO$_x$ catalyst having surfaces in the flue gas conduit, and a molybdenum-oxide-containing surface disposed in the flue gas conduit between the combustion zone and the surfaces for regeneration when the deNO$_x$ catalyst is depleted.

As a result, small quantities of oxygen compounds containing molybdenum oxide are continuously carried along with the flue gas to the downstream deNO$_x$ catalysts, where they counteract an overly large drop in the catalytic activity. This apparatus also develops its effectiveness during normal power plant operation. With it, a shutdown of the power plant for the sake of removing and regenerating the deNO$_x$ catalysts can again be avoided.

In accordance with another feature of the invention, the molybdenum-oxide-containing surface has plates with molybdenum oxide applied in an easily desorbable manner.

In accordance with a further feature of the invention, there is provided an injection device for water vapor being disposed between the molybdenum-oxide-containing surface and the combustion zone.

In accordance with an added feature of the invention, the molybdenum-oxide-containing surface includes an inert material, such as calcined titanium oxide powder, coated with molybdenum oxide and possibly with vanadium oxide.

In accordance with an additional feature of the invention, the molybdenum-oxide-containing surface includes a macroscopic metal substrate structure to which a molybdenum-oxide and vanadium-oxide coated inert material is applied, and the macroscopic metal substrate structure is expanded metal, compacted metal chips, sieves, perforated metal sheets or the like.

In accordance with yet another feature of the invention, the molybdenum-oxide-containing material is applied to the macroscopic metal substrate structure by immersion and ensuing drying or by vapor deposition.

In accordance with a concomitant feature of the invention, there are provided means for drawing off some flue gas downstream of the deNO$_x$ catalyst in an at least partly depleted condition, as seen in flow direction, and feeding back the flue gas into the combustion chamber.

Other features which are considered as characteristic for the invention are set forth in the appended claims.

Although the invention is illustrated and described herein as embodied in a method and an apparatus for regenerating depleted deNO$_x$ catalysts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
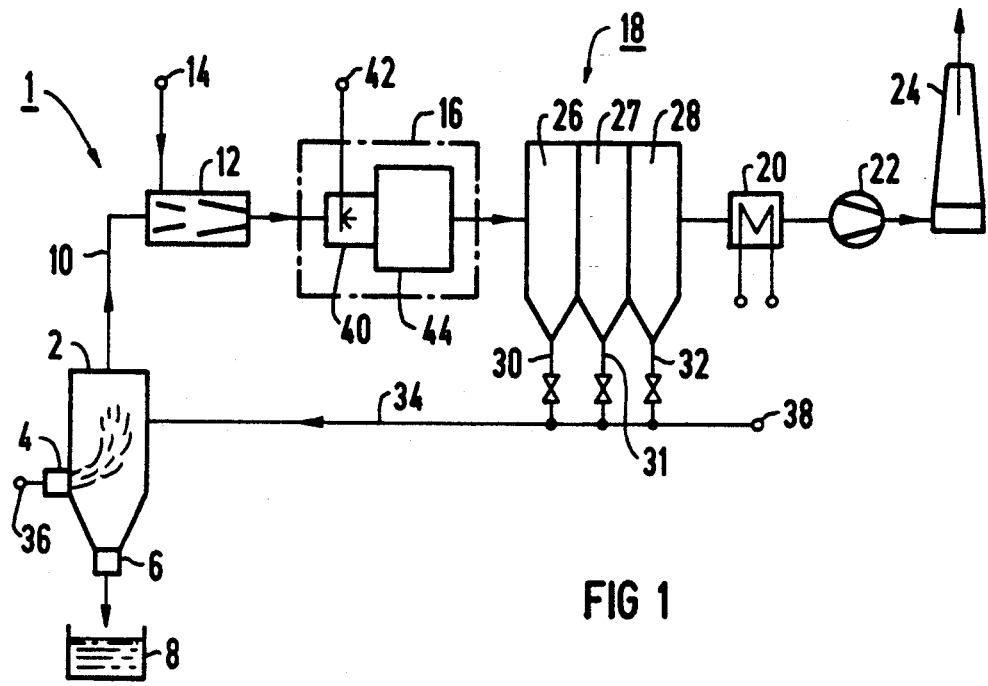
FIG. 1 is a schematic and diagrammatic view of an apparatus in which molybdenum-oxygen compounds can be injected into a flue gas conduit above catalytically active surfaces.

Referring now to the figures of the drawing in detail and first, particularly, to FIG. 1 thereof, there is seen a fossil-fueled power plant 1. The drawing shows a combustion system 2, which in the present case is a steam generator, with a burner 4, a slag outlet 6 with a slag bath 8 connected thereto, and a flue gas line 10. Connected in series in the flue gas line 10 are an injection device 12 for dust 14 containing molybdenum oxide, a nitrogen removal system 16, which is also known as a deNO$_x$ system, a three-stage dust filter system 18, a heat exchanger 20, a suction blower 22, and a chimney 24. Each of the three stages 26, 27, 28 of the dust filter system 18 communicates with the steam generator 2 through a respective dust outlet line 30, 31, 32 and a dust recirculation line 34.

In operation of this combustion system 2, a fossil fuel 36 is blown through the burners 4 into the steam generator 2, where it is combusted in the presence of fresh air 38. The flue gases produced in this process are vented through the flue gas line 10 by the suction blower 22 that is built into the flue gas line 10 and are aspirated successively through the injection device 12, the deNO$_x$ system 16, the dust filter system 18, and the heat exchanger 20, and are fed into the chimney 24. Upon entering the deNO$_x$ system 16, the flue gases flow through an injection device 40 for injecting ammonia 42 into a catalyst configuration 44. At catalytically active surfaces of the catalyst configuration 44, nitrogen oxides, along with the previously injected ammonia 42, are reduced to nitrogen and water vapor. In the dust filter system 18 which is disposed downstream, entrained ash and dust particles are filtered out of these flue gases. The thus-cleaned flue gas is reheated to approximately 130° C. in the heat exchanger 20 that follows the dust filter system 18 and is then blown into the chimney 24 by the suction blower 22. The dust and ash particles retained in the dust filter system 18 are discharged through the dust outlet or discharge lines 30, 31, 32 of the three stages 26, 27, 28 of the dust filter system 18, into the dust recirculation line 34 which is acted upon by fresh air and/or flue gas, and are thus returned to the steam generator 2. There, the dust particles become molten in the heat of the flame and together with the slag they are carried through the slag outlet 6 into the slag bath 8. This binds the dust particles indissolubly in the slag.

If the catalytic activity of the catalyst configuration 44 should fade over the course of time in operation, then with this combustion system 2, dust of this type can be fed into the flue gas through the injection device 12 for dust 14 containing molybdenum oxide. It is then entrained by the flue gases and is deposited on the catalytically active surfaces of the catalyst configuration 44. In this process, the catalytic activity of the catalyst configuration 44 increases, so that its service life can be many times longer. This not only considerably lowers the expense for maintaining deNO$_x$ systems, but it also reduces the incidence of pollutants that have to be disposed of, which are associated with the replacement of depleted deNO$_x$ catalysts. This reduction in pollutants that have to be disposed of is proportional to the lengthening of the service life of the catalyst configuration 44.

Figure 2:
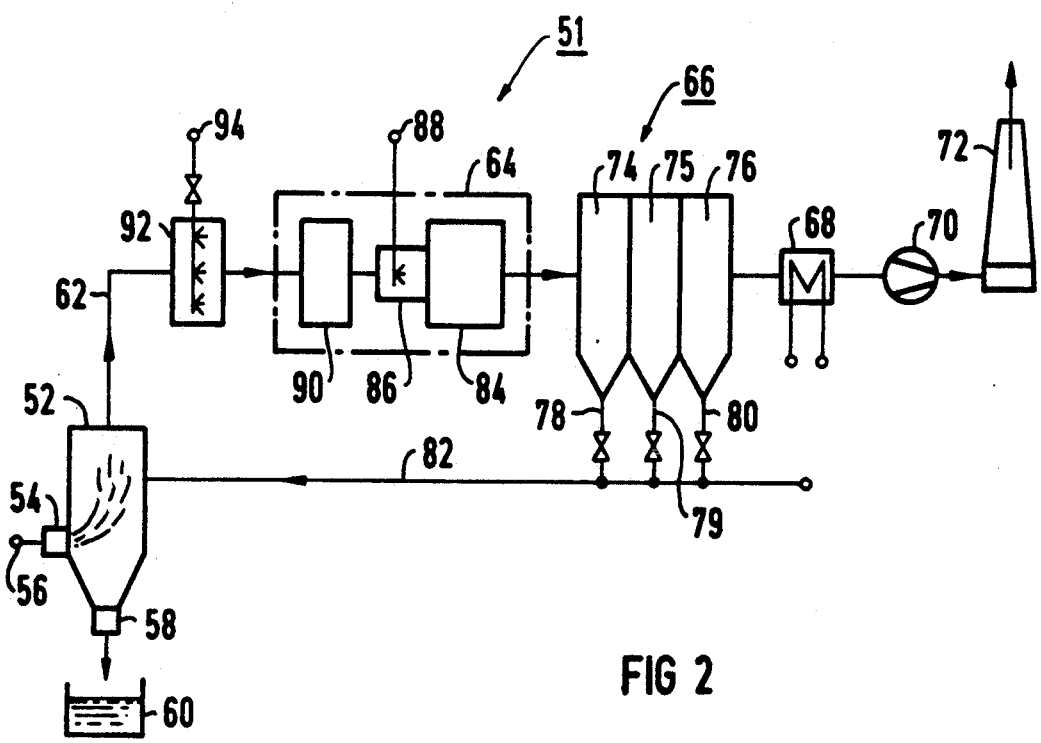
FIG. 2 is a view similar to FIG. 1 of an apparatus in which molybdenum-oxygen compounds are dumped in the flue gas conduit above the catalytically active surfaces.

FIG. 2 shows another power plant 51, which is quite similar in structure to the power plant 1 shown in FIG. 1. Once again, a combustion system 52 is shown, in the form of a steam generator having a burner 54 for fossil fuels 56, with a slag outlet 58 and a slag bath 60. A deNO$_x$ system 64, a dust filter system 66, a heat exchanger system 68, a suction blower 70, and a chimney 72 are successively connected in series in a flue gas line 62. The dust filter system 66 is constructed in three stages. Each of the three stages 74, 75, 76 communicates with a dust outlet or discharge line 78, 79, 80, all three of which discharge into a dust recirculation line 82 that feeds back to the steam generator 52. The deNO$_x$ system 64 includes an injection device 86 for injecting ammonia 88, which is connected to an upstream side of a catalyst configuration 84. Unlike the exemplary embodiment of FIG. 1, in the deNO$_x$ system 64, a configuration 90 of plates with molybdenum oxide applied to the surfaces thereof in an easily desorbable manner is also exposed to the flue gas upstream of the injection device 86 for ammonia. An injection device 92 for water vapor 94 is also provided between the deNO$_x$ system 64 and the combustion system 52.

During the operation of the power plant 51, the fossil fuel 56 is blown through the burner 54 into the steam generator 52, where it is combusted in the presence of fresh air. Given the high temperatures, the resultant slag occurs in the molten state and it is discharged through the slag outlet 58 and carried to the slag bath 60. In this process, the slag hardens into glass-like particles. Due to the suction blower 70 that is built into the flue gas line 62, the flue gases produced in the steam generator 52 are removed by suction through the flue gas line. The flue gases are fed through the injection device 92 for water vapor 94, through the deNO$_x$ system 64, and from there through the dust filter system 66 and the heat exchanger 68 to the chimney 72. The dust and slag particles removed in the dust filter system 66 are fed into the dust recirculation line leading back to the steam generator 52, through the dust removal lines 78, 79, 80 of the various stages 74, 75, 76 of the dust filter system 66. In the dust recirculation line, the dust becomes molten in the heat of the flame and is removed along with the slag. Once again, the injection device 86 for ammonia 88 is provided on the upstream side of the catalyst configuration 84, which is located in the deNO$_x$ system 64. However, this injection device 86 for ammonia 88 is also preceded upstream by the configuration 90 of plates, which has molybdenum oxide applied to the surfaces thereof in an easily desorbable manner, and through which configuration the flue gas flows.

As a result of the natural flue gas moisture, in other words the water vapor produced upon combustion, small quantities of the molybdenum oxide particles applied to the plates in an easily desorbable manner are continuously entrained and dumped onto the downstream surfaces of the catalyst configuration 84. As a result of this continuous deposit of molybdenum oxide onto the catalytically active surfaces of the catalyst configuration 84, the deactivation of this configuration can be markedly reduced. This automatically leads to longer service lives of the catalyst configuration 84. Moreover, by increasing the flue gas moisture, or in other words by injection of additional water vapor through the injection device 92, the desorption speed of the molybdenum oxide dumped in the flue gas line can be increased. By correctly adjusting the flue gas moisture, in other words by performing a careful, suitable additional dosing of water vapor, the catalytic activity of the downstream catalyst configuration can be kept constant over very long time periods. These time periods amount to a multiple of the otherwise expected maximum service life of the catalyst configuration. Once again, this makes it possible to shorten the down times of the power plant and to reduce the quantities that have to be disposed of per unit of heating capacity produced.

I claim:

1. An apparatus for regenerating depleted deNO$_x$ catalysts, comprising a combustion chamber having a combustion zone, a flue gas conduit communicating with said combustion zone, a deNO$_x$ catalyst having surfaces disposed in said flue gas conduit, and an injection device disposed between said combustion zone and said surfaces of said deNO$_x$ catalyst for injecting molybdenum-oxide-containing dust when said deNO$_x$ catalyst is depleted.

2. An apparatus for regenerating depleted deNO$_x$ catalysts, comprising a combustion chamber having a combustion zone, a flue gas conduit communicating with said combustion zone, a deNO$_x$ catalyst having surfaces disposed in said flue gas conduit, and a molybdenum-oxide-containing surface disposed in said flue gas conduit between said combustion zone and said surfaces of said deNO$_x$ catalyst for regeneration when said deNO$_x$ catalyst is depleted.

3. The apparatus according to claim 2, wherein said molybdenum-oxide-containing surface has plates with molybdenum oxide applied in an easily desorbable manner.

4. The apparatus according to claim 2, including an injection device for injecting water vapor being disposed between said molybdenum-oxide-containing surface and said combustion zone.

5. The apparatus according to claim 2, wherein said molybdenum-oxide-containing surface includes an inert material.

6. The apparatus according to claim 2, wherein said molybdenum-oxide-containing surface includes calcined titanium oxide powder.

7. The apparatus according to claim 2, wherein said molybdenum-oxide-containing surface includes calcined titanium oxide powder coated with molybdenum oxide.

8. The apparatus according to claim 2, wherein said molybdenum-oxide-containing surface includes calcined titanium oxide powder coated with vanadium oxide.

9. The apparatus according to claim 2, wherein said molybdenum-oxide-containing surface includes a macroscopic metal substrate structure to which a molybdenum-oxide and vanadium-oxide coated inert material is applied.

10. The apparatus according to claim 9, wherein said macroscopic metal substrate structure is selected from the group consisting of expanded metal, compacted metal chips, sieves and perforated metal sheets.

11. The apparatus according to claim 2, including means for drawing off some flue gas downstream of said deNO$_x$ catalyst as seen in a flow direction of the flue gas when said deNO$_x$ catalyst is in an at least partly depleted condition, and feeding back the flue gas into said combustion chamber.

* * * * *